Patented Sept. 21, 1937

2,093,463

UNITED STATES PATENT OFFICE 2,093,463

INORGANIC SALTS OF CELLULOSE DICARBOXYLATES AND THEIR PREPARATION

Carl J. Malm, Rochester, N. Y., and Charles E. Waring, Dayton, Ohio, assignors, by mesne assignments, to Eastman Kodak Company, Jersey City, N. J., a corporation of New Jersey No Drawing. Application July 30, 1932, Serial No. 627,149

22 Claims. (Cl. 260—101)

The present invention relates to the cellulose dicarboxylate salts of the inorganic water-soluble hydroxides and their preparation. The present application is in part a continuation of our application Serial No. 380,252, filed July 22, 1929.

It is the object of our invention to provide a process for preparing cellulose derivatives which are water soluble. Other objects will hereinafter appear.

We have found that the cellulose acetate-dicarboxylates, such as a cellulose acetate phthalate having an unesterified carboxyl group, may be neutralized with an aqueous solution of an inorganic water-soluble hydroxide to form a salt of the cellulose acetate-dicarboxylate. We have found that the salts resulting from the treatment of a cellulose acetate-dicarboxylate with an inorganic water-soluble hydroxide are water soluble and may be coated out from their aqueous solutions to form sheets or skins.

The preparation of the water-soluble salts of a cellulose acetate-dicarboxylate may be carried out by adding a basic solution (such as of sodium, potassium or ammonium hydroxide) to a solution of the acetate-dicarboxylate dissolved in a liquid which is a good solvent for both the cellulose acetate dicarboxylate and the salt to be formed, until neutrality is attained, and then the neutralized solution may be poured into a liquid which will precipitate out the salt.

The preparation of these salts may instead be carried out in a liquid which is a solvent of both the dicarboxylic acid ester of cellulose and the base employed in the reaction but which is a non-solvent of the salt formed. In this case the salt precipitates out upon its formation so that the final product may be separated from the reaction mixture merely by filtration.

The starting material for our processes is preferably that prepared by reacting upon a cellulose acetate with a dicarboxylic acid anhydride in the presence of an organic base such as pyridine as is disclosed and claimed in our application Serial No. 380,252 referred to above. As was pointed out in that application, the final product of that esterification is preferably treated with an acid to remove the organic base therefrom prior to its neutralization with the aqueous hydroxide solution. If desired, the product resulting from the treatment of cellulose with the dicarboxylic acid anhydride and an organic base may be employed. The acetate-dicarboxylate, however, is preferred as the starting material. For example, cellulose acetate-phthalate or cellulose acetate-succinate are eminently suited for use in this connection.

The following examples illustrate the embodiment of our invention in processes in which cellulose acetate-phthalate is used as the starting material:

Example I 100 grams of a cellulose acetate phthalate having a phthalyl content of 35% was dissolved in a liter of anhydrous acetone. A current of dry ammonia gas was then slowly led into the solution accompanied by constant stirring. As the ammonia was being introduced, the ammonium salt of cellulose acetate phthalate was precipitated and after an excess of ammonia had been added, the completely precipitated salt had settled to the bottom. The precipitated salt was then filtered off, washed with acetone and dried. The freshly prepared product was readily soluble in water and methyl alcohol.

Example II

A kilogram of a cellulose acetate phthalate having a phthalyl content of about 35% was dissolved in about 10 liters of ethylene glycol monomethyl ether. A 10% solution of potassium hydroxide in a mixture of equal volumes of water and ethylene glycol monomethyl ether was added slowly and with continuous stirring until the solution was exactly neutral to both litmus and phenolphthalein. The cellulose acetate potassium phthalate formed was precipitated out from the mass by pouring it into an excess of acetone. It was then washed several times with acetone and dried. The product was soluble in distilled water, ethylene glycol monomethyl ether and in various acetone-methyl alcohol mixtures.

Example III

The procedure of Example II was repeated except that sodium hydroxide instead of potassium hydroxide was employed. A product soluble in water, ethylene glycol monomethyl ether and in acetone-methyl alcohol mixtures, was obtained.

Sodium or potassium salts of cellulose acetate phthalate having a low phthalyl content are also soluble in methyl alcohol, ethyl lactate, benzene-methanol, toluene-methanol and β-methoxy ethyl alcohol.

These salts of the cellulose acetate dicarboxylates soluble in suitable solvents may be coated out into clear, transparent, sheets or skins. For example, cellulose acetate potassium phthalate may be coated from water, aqueous methyl alcohol, acetone-methyl alcohol or ethylene glycol monomethyl ether.

As compounds which contain chemically combined cellulose and yet which are water soluble are rare the alkali metal salts of the cellulose acetate dicarboxylates give promise of great utility in the future. They may, for example, find use in adhesive compositions, as a sizing material or as a vehicle for carrying dyes or pigments. Various uses will suggest themselves to individuals in arts which require a material having the chemical composition and properties of the compounds which we have discovered.

The compounds which we have discovered may be represented by the formula:

in which

represents the $C_6$ portion of a cellulose molecule, X may represent either an acetyl, hydroxyl and/or a —Y—M group, Y represents a dicarboxylic acid group such as a phthalyl or succinyl group and M represents either $NH_4$, Na, K, Li, Rb or Cs. For example, the sodium salt of a cellulose acetate phthalate might be represented by the formula,

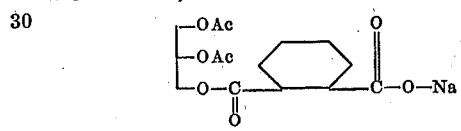

a potassium salt of a cellulose acetate succinate might be represented by the formula

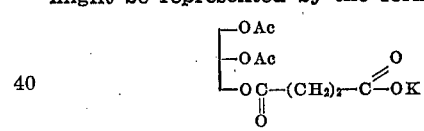

and a sodium salt of cellulose diphthalate might be represented by the formula

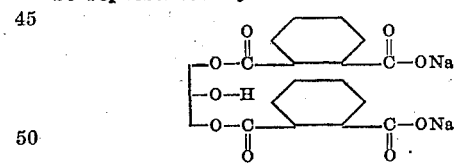

The salt of the cellulose mono-phthalate is similar except that only one OH group has been esterified by the phthalyl radical.

It is to be understood that the proportions of the acetyl, dicarboxyl and hydroxyl in the molecule are not limited by these illustrations as this proportion depends on the percentage of each group present and it may even vary from molecule to molecule in each compound.

It is to be understood that wherever the term "represented by" is employed in the present specification and claims in referring to the structural formula of a compound, that structural formula, especially where cellulose compounds are involved, does not restrict the compound which it represents to the proportions which are set forth therein. For instance, cellulose is represented by merely a $C_6$ portion of the cellulose molecule. However, due to the great number of these units which are present in cellulose it may be readily seen that almost any proportion of groups might be present in a cellulose compound.

Having now described our invention, what we claim and desire to be secured by Letters Patent of the United States is:

1. A salt of a cellulose ester represented by the formula,

in which

represents the $C_6$ portion of a cellulose molecule, each X represents either an acetyl, hydroxyl or —Y—M group, Y represents a dicarboxylic acid radical in which the carboxyl groups are joined by intervening atoms, one of the two carboxyl groups of the dicarboxylic acid radicals being joined to the cellulose and M represents either $NH_4$, K, Na, Li, Rb or Cs.

2. A salt of a cellulose ester represented by the formula represents a $C_6$ portion of a cellulose molecule, each X represents an acetyl or a and M represents either $NH_4$, Na, K, Li, Rb or Cs.

3. An alkali metal salt of a cellulose ester containing a dicarboxylic acid radical the carboxyl groups of which are linked by intervening atoms one of the two carboxyl groups of the dicarboxylic acid radicals being joined to the cellulose.

4. An alkali metal salt of a cellulose acetate dicarboxylate the carboxyl groups of the dicarboxylic acid radical being linked by intervening atoms.

5. An alkali metal salt of a cellulose acetate phthalate.

6. An alkali metal salt of a cellulose acetate succinate.

7. A sodium salt of a cellulose ester containing a dicarboxylic acid radical the carboxyl groups of which are linked by intervening atoms one of the two carboxyl groups of the dicarboxylic acid radicals being joined to the cellulose.

8. A sodium salt of a cellulose acetate dicarboxylate the carboxyl groups of the dicarboxylic acid radical being linked by intervening atoms.

9. A sodium salt of a cellulose acetate phthalate.

10. A sodium salt of a cellulose acetat-succinate.

11. A potassium salt of a cellulose acetate phthalate.

12. The process of preparing a water-soluble salt of a dicarboxylic acid ester of cellulose, the carboxyl groups of the dicarboxylic acid radicals thereof being linked by intervening atoms which comprises slowly reacting upon the ester with an inorganic water-soluble base.

13. The process of preparing a water-soluble salt of a dicarboxylic acid ester of cellulose, the carboxyl groups of the dicarboxylic acid radicals thereof being linked by intervening atoms which comprises slowly reacting upon the ester with an aqueous solution of a basic alkali metal compound.

14. The process of preparing a water-soluble salt of a dicarboxylic acid ester of cellulose acetate, the carboxyl groups of the dicarboxylic acid radicals being linked by intervening atoms which comprises slowly reacting upon the ester with an aqueous solution of an inorganic water-soluble basic compound.

15. The process of preparing a water-soluble salt of a phthalate acid ester of cellulose which comprises slowly reacting upon the ester with an aqueous solution of an inorganic water-soluble basic compound.

16. The process of preparing a water-soluble salt of a dicarboxylic acid ester of cellulose acetate which comprises slowly reacting upon the ester with an aqueous solution of a basic alkali metal compound.

17. The process of preparing a water-soluble salt of a dicarboxylic acid ester of cellulose, the carboxyl groups of the dicarboxylic acid radicals thereof being linked by intervening atoms which comprises slowly reacting upon the ester with an aqueous solution of an alkali metal hydroxide.

18. The process of preparing a water-soluble salt of a phthalate acid ester of cellulose which comprises slowly reacting upon the ester with an aqueous solution of an alkali metal hydroxide.

19. The process of preparing a water-soluble salt of a succinic acid ester of cellulose which comprises slowly reacting upon the ester with an aqueous solution of an inorganic water-soluble basic compound.

20. The process of preparing a water-soluble salt of a phthalate acid ester of cellulose acetate which comprises slowly reacting upon the ester with an aqueous solution of an alkali metal hydroxide.

21. The process of preparing a water-soluble salt of a succinic acid ester of cellulose acetate which comprises slowly reacting upon the ester with an aqueous solution of an alkali metal hydroxide.

22. The process of preparing a water-soluble salt of an acid dicarboxylic acid ester of cellulose which comprises slowly reacting upon that ester with an aqueous solution of a water-soluble basic alkali metal compound.

CARL J. MALM.
CHARLES E. WARING.